(12) United States Patent
Mills et al.

(10) Patent No.: US 9,184,907 B2
(45) Date of Patent: Nov. 10, 2015

(54) FLEXIBLE THRESHOLD COUNTER FOR CLOCK-AND-DATA RECOVERY

(71) Applicant: NVIDIA Corporation, Santa Clara, CA (US)

(72) Inventors: Peter C. Mills, San Jose, CA (US); Gautam Bhatia, Sunnyvale, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 217 days.

(21) Appl. No.: 13/730,556

(22) Filed: Dec. 28, 2012

(65) Prior Publication Data

US 2014/0185633 A1    Jul. 3, 2014

(51) Int. Cl.
*H04L 7/00* (2006.01)

(52) U.S. Cl.
CPC .................................. *H04L 7/0037* (2013.01)

(58) Field of Classification Search
CPC .................................................... H04L 7/0037
USPC .......................................................... 370/517
See application file for complete search history.

(56) References Cited

U.S. PATENT DOCUMENTS

| | | | | |
|---|---|---|---|---|
| 5,436,937 | A * | 7/1995 | Brown et al. | ................. 375/376 |
| 2004/0091064 | A1 | 5/2004 | Cao et al. | |
| 2004/0091073 | A1 * | 5/2004 | Smith et al. | .................... 375/355 |
| 2004/0202266 | A1 | 10/2004 | Gregorius et al. | |
| 2005/0180536 | A1 | 8/2005 | Payne et al. | |
| 2006/0114069 | A1 | 6/2006 | Kojima et al. | |
| 2006/0158262 | A1 | 7/2006 | Robinson et al. | |
| 2009/0296867 | A1 | 12/2009 | Do et al. | |
| 2010/0103999 | A1 | 4/2010 | Leibowitz | |
| 2011/0243215 | A1 | 10/2011 | Wu et al. | |
| 2012/0033773 | A1 | 2/2012 | Nedovic | |
| 2012/0106539 | A1 | 5/2012 | Ferraiolo | |
| 2012/0106687 | A1 | 5/2012 | Bulzacchelli et al. | |
| 2012/0128055 | A1 | 5/2012 | Jiang | |
| 2012/0151247 | A1 | 6/2012 | Ferraiolo | |
| 2012/0250811 | A1 | 10/2012 | Misek et al. | |
| 2013/0070882 | A1 | 3/2013 | Nedovic | |
| 2013/0154698 | A1 | 6/2013 | Bottelli et al. | |
| 2013/0249612 | A1 | 9/2013 | Zerbe et al. | |
| 2014/0016692 | A1 | 1/2014 | Leibowitz et al. | |

FOREIGN PATENT DOCUMENTS

TW        201228304        7/2012

* cited by examiner

*Primary Examiner* — Dang Ton
*Assistant Examiner* — Mewale Ambaye

(57) ABSTRACT

One embodiment provides a data-receiving device component comprising a phase shifter, timer logic, and control logic. The phase shifter is configured to release a train of clock pulses with a controlled phase shift. The timer logic is configured to receive data from a data-sending device, and for each transition of the data received, to determine whether a clock pulse from the train is early or late with respect to the transition, and to tally the late clock pulses relative to the early clock pulses. The control logic, operatively coupled to the phase shifter and to the timer logic, is configured to incrementally advance the phase shift when the late clock pulses outnumber the early clock pulses by a non-integer power of two.

20 Claims, 3 Drawing Sheets

FLEXIBLE THRESHOLD COUNTER FOR CLOCK-AND-DATA RECOVERY

BACKGROUND

A high-speed digital interface may be used to carry data within an electronic device or from one electronic device to another. In many scenarios, the data carried over the interface is synchronized to a clock signal of the sending device, which typically is not carried over the interface. In order to parse the data it receives, the receiving device will attempt to recreate the clock signal of the sending device. A so-called clock-and-data recovery (CDR) circuit may be used for this purpose.

A CDR circuit adjusts the frequency and phase of a local clock in the receiving device to achieve consistency with the various logic transitions of the data received. In high-speed applications, the CDR circuit must tolerate the effects of clock jitter in the sending and/or receiving clocks, as well as signal drift in the sent data. To this end, the CDR circuit may tally the clock pulses arriving early with respect to the data, versus the clock pulses arriving late. The relative tally is then shifted and added into a binary register. In this configuration, a chosen output transition of the register triggers advance of the local clock phase when late arrivals outnumber early arrivals by a threshold number; a complementary output transition triggers retard of the local clock phase when early arrivals outnumber late arrivals by the threshold number. The threshold number is programmable in this approach, inasmuch as any output bit of the register may be chosen to trigger advance or retard of the local clock phase. Naturally, however, the threshold is limited to integer powers of two.

In the CDR approach summarized above, the register bit chosen to trigger advance or retard of the local clock phase may be determined by an adjustable filter setting for the CDR circuit. A CDR circuit with a large filter setting (updating the clock phase on a high power of two) may react slowly to timing changes in the data, but will not overshoot the required clock phase. Conversely, a CDR circuit with a small filter setting (updating on a low power of two) will respond more quickly to timing changes in the data, but may overshoot the required clock phase, thereby introducing additional jitter. Accordingly, a filter setting that is either too high or too low for a given interface is undesirable, as it may limit the bandwidth of error-free transmission.

DETAILED DESCRIPTION

Figure 1:
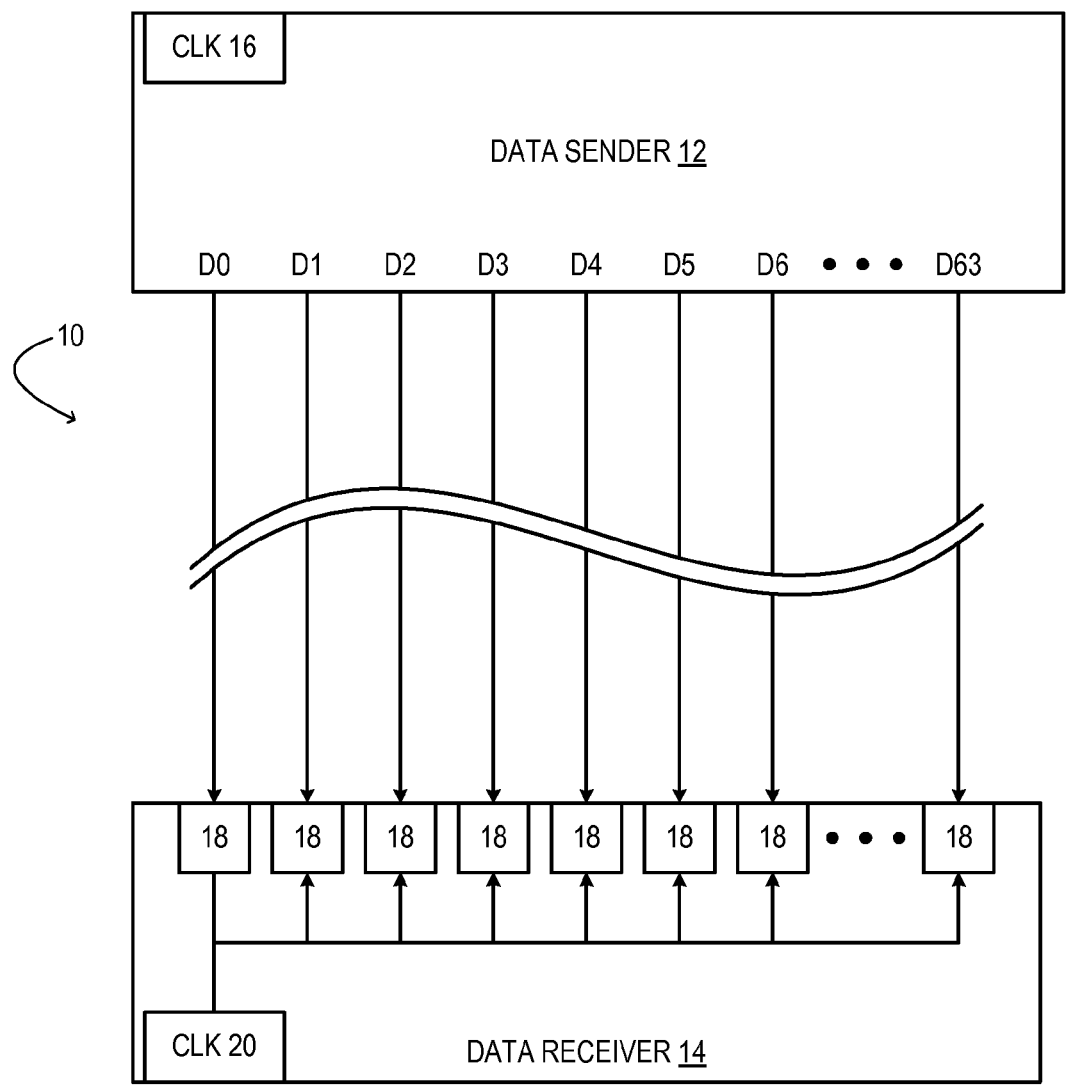
FIG. 1 shows aspects of a high-speed digital interface in accordance with an embodiment of this disclosure.

Aspects of this disclosure will now be described by example and with reference to the illustrated embodiments listed above. Components, process steps, and other elements that may be substantially the same in one or more embodiments are identified coordinately and are described with minimal repetition. It will be noted, however, that elements identified coordinately may also differ to some degree. It will be further noted that the drawing figures included in this disclosure are schematic and generally not drawn to scale. Rather, the various drawing scales, aspect ratios, and numbers of components shown in the figures may be purposely distorted to make certain features or relationships easier to see.

FIG. 1 schematically shows aspects of a high-speed digital interface 10 in one embodiment. The interface as shown includes sixty-four channels labeled D0 through D63. Other embodiments may include more or fewer channels. Each channel carries one-bit, digital data from data sender 12 to data receiver 14. In the embodiments here contemplated, the data sender and data receiver may be discrete electronic devices or discrete components of the same electronic device. For example, the data sender may be a central processing unit (CPU) of a computer, cellular telephone, handheld media player, or game system. The data receiver may be a graphics processing unit (GPU), ethernet chip, hard drive, or hard-drive controller, for example.

For ease of illustration, FIG. 1 shows one data sender 12 and one data receiver 14; in other embodiments, a given data sender may send data to a plurality of data receivers. A given data receiver may likewise receive data from a plurality of data senders. All aspects of this disclosure are further applicable to bi-directional exchange of data over an interface. In other words, data sender 12 may be configured also to receive data from data-receiver 14, over interface 10.

Continuing in FIG. 1, the data transmitted over interface 10 may be synchronized, within practical limits, to clock 16 of data sender 12. However, data receiver 14 may not have direct access to that clock. Instead, in order to parse the data it receives over the interface, the data receiver may include a series of so-called clock-and-data recovery (CDR) circuits 18, one for each channel. Each CDR circuit attempts to recreate the clock signal underlying the data in its associated channel. It does so by inducing an appropriate phase shift in the pulse train of local clock 20, which is supplied to each CDR circuit. More specifically, the CDR circuit adjusts the phase of the local clock to achieve consistency with the various logic transitions of the data received. In some embodiments, the CDR circuit may also adjust the frequency of the local clock, as needed, to achieve consistency with the logic transitions of the data received.

Figure 2:
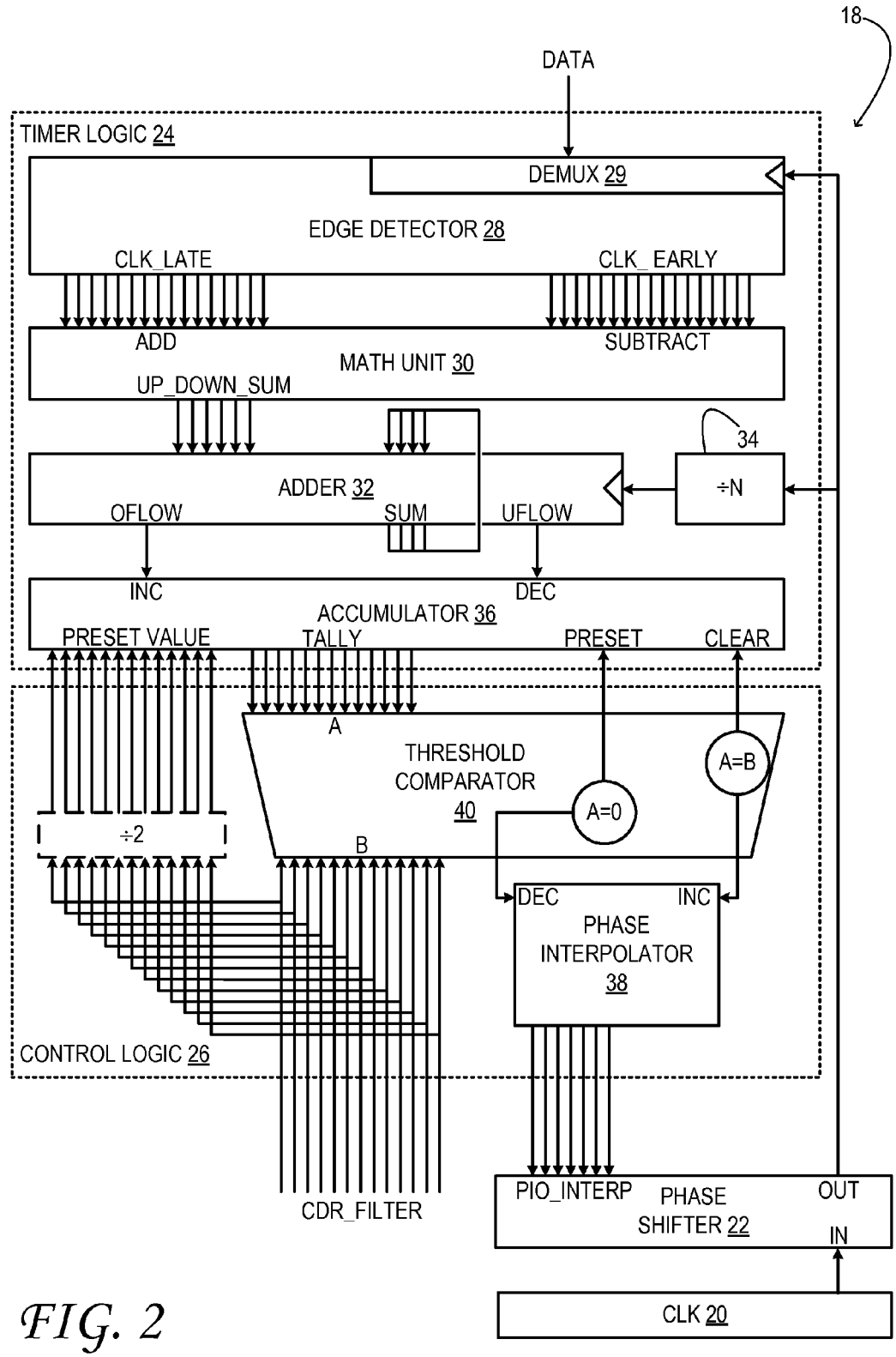
FIG. 2 shows aspects of an example CDR circuit in accordance with an embodiment of this disclosure.

FIG. 2 shows aspects of an example CDR circuit 18 in one embodiment. Each CDR circuit includes phase shifter 22, timer logic 24, and control logic 26. The phase shifter is configured to receive a train of clock pulses from local clock 20 and to release a corresponding train of clock pulses with a controlled phase shift. In other words, every clock pulse released from the phase shifter is shifted in phase by a controlled amount relative to the corresponding pulse received from the local clock. In the illustrated embodiment, the direction and amount of the applied phase shift is determined by a signed, 7-bit parameter PIO_INTERP, as described in further detail below. A 'signed, M-bit' number, as used herein, contains M−1 data bits in addition to one sign bit. The reader should note, however, that the bit widths of the various parameters discussed herein, and the registers that hold them, are given only as examples. In every case, different bit widths may be used instead, without departing from the scope of this disclosure.

Continuing in FIG. 2, timer logic 24 and control logic 26 exert closed-loop control over phase shifter 22 to provide a phase-shifted pulse train that matches, as closely as possible, the clock signal underlying the data received in CDR circuit 18. This action compensates for the effects of clock jitter in the remote and/or local clock, as well as signal drift in the sent data.

In the illustrated embodiment, timer logic 24 includes edge detector 28. The edge detector is configured to receive a single channel of data from data sender 12 over interface 10. The edge detector also receives the phase-shifted clock-pulse train from phase shifter 22. Logic within the edge detector determines, for each transition of the data, whether the concurrent clock pulse from the train is received before the leading edge of the transition (early with respect to the transition), or whether it is received after the leading edge of the transition (late with respect to the transition). In effect, the edge detector compares the data captured at an edge of each clock pulse to the data captured at the eye of each clock pulse, to determine whether the clock pulse is early or late with respect to the transition.

In some embodiments, each channel of interface 10 may transmit data of such high frequency that it is impractical to distinguish late clock pulses from early clock pulses and tally the result in real time. Therefore, edge detector 28 includes a 1×N demultiplexer 29, which is clocked from the output of phase shifter 22. The demultiplexer parses the single-channel input data into N time-demultiplexed data lines for subsequent, parallel processing. Such processing my include N redundant XOR-type structures and delay-generating elements, which distinguish whether the clock pulse is late or early with respect to the demultiplexed data on a particular line. As described in more detail hereinafter, the value of N may differ in the different embodiments of this disclosure. N may equal any integer, or preferably an integer power of two; in one non-limiting embodiment, N may equal 16.

For each of the N demultiplexed data lines, edge detector 28 sets a corresponding CLK_EARLY bit if the clock pulse is early with respect to the data on that line. Likewise, the edge detector sets a corresponding CLK_LATE bit if the clock pulse is late with respect to the data on that line. In the illustrated embodiment, the CLK_EARLY and CLK_LATE bits are combined in math unit 30 to yield a signed value that equates to the number of late clock pulses relative to the number of early clock pulses (late minus early) in the demultiplexed data. In other words, the UP_DOWN_SUM from the math unit may equal the sum of the CLK_LATE bits set by the edge detector minus the sum of the CLK_EARLY bits set by the edge detector. In FIG. 2, this signed value is denoted UP_DOWN_SUM. To increase processing speed, the math unit may include only combinational logic, as opposed to sequential or state logic. In one embodiment, the UP_DOWN_SUM provided by math unit 30 may be N+2 bits wide. This is the number of bits needed to represent the positive number N in two's complement binary form (which, in the present example, would correspond to all clock pulses in the demultiplexed data arriving late). In one non-limiting embodiment, the math unit may be six bits wide.

In view of the N-bit demultiplexing scheme enacted in edge detector 28, the tally of late versus early clock pulses reaches maturity at every $N^{th}$ clock pulse. Therefore, timer logic 24 includes a clock divider 34, which divides the frequency of the phase shifted local clock by the value N. The output of this clock divider is used to trigger the update of adder 32, which is configured as a wrap-around adder. After every N clock cycles, the UP_DOWN_SUM from the math unit is added into the adder. Accordingly, the adder advances, after a period of N clock cycles from the local clock pulse train, by the signed number of late clock pulses relative to early clock pulses received in timer logic 24 within that period. Chosen at design time, the value of N effectively defines the update frequency of CDR circuit 18 in terms of the channel frequency of interface 10. In one embodiment, N may equal the ratio of the channel frequency to the CDR update frequency.

Continuing in FIG. 2, each update of adder 32 can potentially result in an overflow (OFLOW) or underflow (UFLOW) of the contents of the adder, depending on the UP_DOWN_SUM. The OFLOW and UFLOW outputs of the adder are therefore provided to downstream componentry of CDR circuit 18 so that the tally is not lost upon overflow or underflow of the adder. Accordingly, the adder itself need only be wide enough to ensure that no update can result in double wrapping—i.e., the sum that remains in the adder after the update must be valid when the overflow or underflow is accounted for. In one embodiment, therefore, the adder may be N bits wide—four bits in some examples.

As shown in FIG. 2, the overflow and underflow bits from adder 32 are applied to the up and down clock inputs of presettable, accumulator 36 of timer logic 24. In this manner, the accumulator tallies, in units of N, the number of late clock pulses received in timer logic 24 relative to the early clock pulses. The accumulator may be of any desired width—13 bits in one example—so that relatively large positive and negative count values may be accumulated. The inventors herein have recognized an advantage in using a single bit (OFLOW or UFLOW) to update the relatively wide accumulator 36. In particular, this strategy allows ample time to implement an exact threshold comparison of the accumulator contents in control logic 26, which will now be described.

Control logic 26 includes phase interpolator 38 and threshold comparator 40. The phase interpolator is an up-down binary counter whose signed output PIO_INTERP determines the magnitude and direction of the phase shift applied by phase shifter 22. The threshold comparator receives from accumulator 36 a tally of the late clock pulses relative to the early clock pulses, and compares the tally to one or more reference values. The threshold comparator increments the phase interpolator when the tally exceeds a first reference value, and decrements the phase interpolator when the tally wraps below a second reference value.

In the embodiment shown in FIG. 2, threshold comparator 40 receives the output of accumulator 36 at input A. The threshold comparator also receives a 13-bit unsigned CDR_FILTER value at input B, as the first reference value. If the accumulator exceeds CDR_FILTER, then the comparator increments the phase interpolator, and clears the accumulator to a value of zero. If the accumulator wraps below zero, as the second reference value, then the comparator decrements the phase interpolator and presets the accumulator to CDR_FILTER. On entry or on reset of the CDR circuit, the accumulator may be set to CDR_FILTER\2, to provide unbiased response to late and early clock pulses. Accordingly, the tally held in the accumulator may, in some scenarios, be offset by the preset value loaded into the accumulator initially, or with every retard of the phase shift.

In CDR circuit 18 as illustrated, the CDR_FILTER parameter may be programmed to any suitable value. Accordingly, phase interpolator 38 may update when the number of late clock pulses and the number of early clock pulses differ from each other by the product of a signed integer times the width of adder 32. With a 4-bit adder, for example, such difference thresholds may include {−65536, −65520, . . . , 0, . . . , 65504, 65520}, late minus early. This is a distinct advantage over CDR circuits in which a binary counter bit is used to trigger advance or retard of the clock phase. There, the thresholds are limited to integer powers of two (minus one if the integer is positive), further multiplied by whatever shift factor N is applied to the UP_DOWN_SUM as it enters the counter—e.g., {−65536, −32768, . . . , 0, . . . , 32752, 65520} assuming N=16. In the present approach, by contrast, the control logic is configured to incrementally advance the phase shift when the late clock pulses outnumber the early clock pulses even by a non-integer power of two, and to incrementally retard the phase shift when the early clock pulses outnumber the late clock pulses by a non-integer power of two. The present approach provides linear control over the difference thresholds—and therefore much finer control, especially at relatively high filter values. By providing finer control over these thresholds, the interface designer can better avoid the slow response associated with too large a filter setting and the overshoot/jitter associated with too small a filter setting.

The configurations described above enable various methods to reproduce a clock-pulse train of a data sender based on data received from the data sender. Accordingly, some methods are now described, by way of example, with continued reference to the above configurations. It will be understood, however, that the methods here described, and others fully within the scope of this disclosure, may be enabled by other configurations as well. Naturally, each execution of a method may change the entry conditions for a subsequent execution and thereby invoke a complex decision-making logic. Such logic is fully contemplated in this disclosure. Some of the process steps described and/or illustrated herein may, in some embodiments, be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Figure 3:
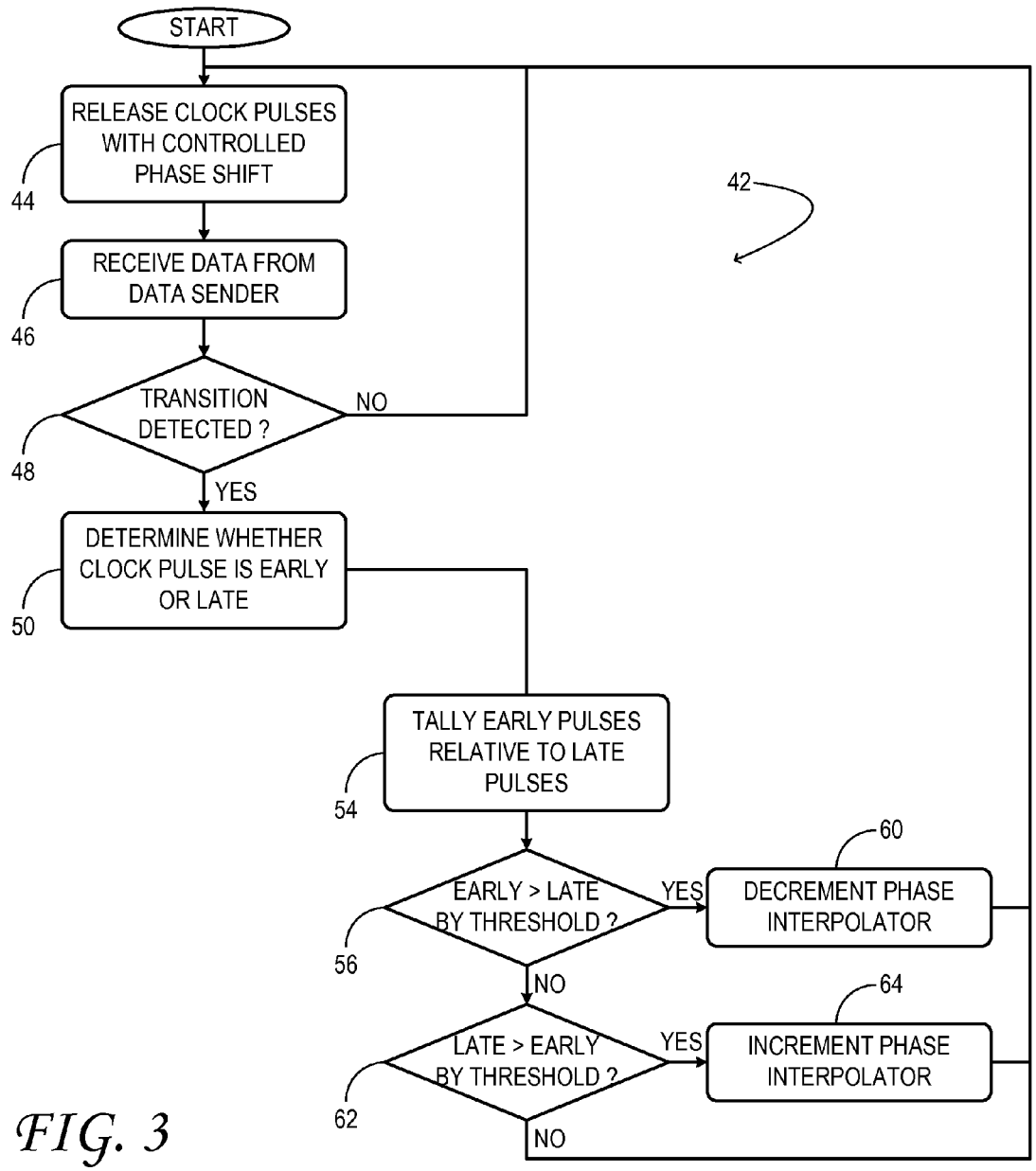
FIG. 3 illustrates an example method to reproduce a clock-pulse train of a data sender based on data received from the data sender, in accordance with an embodiment of this disclosure.

FIG. 3 illustrates an example method 42 to reproduce a clock-pulse train of a data sender based on data received from the data sender. The method may be enacted in a CDR circuit of a data receiver. At 44 of method 42, a train of clock pulses with a controlled phase shift is released from a phase shifter. At 46 data is received from the data sender. Naturally, the data will include a plurality of logic transitions. At 48 it is determined whether a logic transition is detected in the data. If a logic transition is detected, then the method advances to 50. At 50 it is determined whether a clock pulse from the train is late or early with respect to the transition. At 54 the late clock pulses are tallied relative to the early clock pulses. At 56 it is determined whether the early clock pulses outnumber the late clock pulses by a threshold. If the early clock pulses outnumber the late clock pulses by the threshold, then the method advances to 60, where the phase interpolator is decremented. Otherwise it is determined at 62 whether the late clock pulses outnumber the early clock pulses by a threshold. If so, the method advances to 64, where the phase interpolator is incremented. As noted hereinabove, the thresholds applied in this method may be non-integer powers of two. Accordingly, the phase shift may be incrementally advanced when the late clock pulses outnumber the early clock pulses by a non-integer power of two and retarded when the early pulses outnumber the late pulses by a non-integer power of two. Such advancing and retarding may include comparing, in number, the late clock pulses relative to the early clock pulses versus a non-integer power-of-two threshold.

The invention claimed is:

1. A data-receiving device comprising:
   a phase shifter configured to generate a train of clock pulses with a controlled phase shift;
   a timer circuit configured to time-demultiplex every N clock cycles of data received from a data-sending device into parallel data, wherein N>1, and wherein said timer circuit, for each transition of the data received and based on the parallel data, is further configured to determine whether a concurrent clock pulse from the train is early or late with respect to the transition, and to tally the late clock pulses relative to the early clock pulses; and
   a control circuit coupled to the phase shifter and to the timer circuit and configured to cause the phase shifter to incrementally advance the phase shift when the late clock pulses outnumber the early clock pulses by a non-integer power of two based on a tally result accumulated over every N clock cycles.

2. The data-receiving device of claim 1 wherein the control circuit is further configured to cause the phase shifter to incrementally retard the phase shift when the early clock pulses outnumber the late clock pulses by a non-integer power of two.

3. The data-receiving device of claim 1 wherein the timer circuit comprises an edge detector configured, for each transition of the data received, to compare the data at an edge of the clock pulse to the data at an eye of the clock pulse to determine whether the clock pulse is early or late with respect to the transition.

4. The data-receiving device of claim 3 wherein the data compared by the edge detector is single-channel, time-demultiplexed data.

5. The data-receiving device of claim 3 wherein the timer circuit further comprises a math unit configured to tally the late clock pulses relative to the early clock pulses in the data compared by the edge detector over N clock cycles.

6. The data-receiving device of claim 1 wherein the timer circuit comprises a presettable accumulator configured to accumulate a tally of the late clock pulses relative to the early clock pulses in units greater than one.

7. The data-receiving device of claim 6 wherein the tally is offset by a preset value loaded into the accumulator on retard of the phase shift, and wherein the preset value is based on a filter setting of the device.

8. The data-receiving device of claim 6 wherein the accumulator is configured to update the tally upon receipt of a one-bit signal.

9. The data-receiving device of claim 6 wherein the timer circuit further comprises a wrap-around adder configured to advance, when triggered, by a signed number of the late clock pulses relative to the early clock pulses received within N clock cycles, wherein an overflow of the adder increments the accumulator, and wherein an underflow of the adder decrements the accumulator.

10. The data-receiving device of claim 9 wherein the data is received at a predetermined channel frequency, wherein the phase shift is updated at a predetermined update frequency, and wherein the adder is equal in width to a base-two logarithm of a ratio of the channel frequency to the update frequency.

11. The data-receiving device of claim 1 wherein the control circuit comprises a phase interpolator, which comprises an up-down binary counter whose signed output determines the phase shift.

12. The data-receiving device of claim 11 wherein the control circuit comprises a threshold comparator that receives a tally of the late clock pulses relative to the early clock pulses, and is configured to compare the tally to one or more reference values.

13. The data-receiving device of claim 12 wherein the threshold comparator is configured to increment the phase interpolator when the tally exceeds a first reference value, and decrement the phase interpolator when the tally wraps below a second reference value.

14. The data-receiving device of claim 13 wherein the tally is offset by a preset value based on a filter setting of the device, wherein the first reference value is equal to the preset value, and wherein the second reference value is equal to zero.

15. The data-receiving device of claim 1 further comprising a local clock configured to provide an input pulse train to the phase shifter.

16. The data-receiving device of claim 1 wherein the phase shifter, the timer circuit, and the control circuit are components of a clock-and-data recovery circuit.

17. A data-receiving device comprising:
  a phase shifter configured to release a train of clock pulses with a controlled phase shift;
  an edge detector configured to receive data from a data-sending device, and for each transition of the data received, to compare the data at an edge of the clock pulse to the data at an eye of the clock pulse to determine whether the clock pulse is early or late with respect to the transition;
  a math unit configured to tally late versus early clock pulses in the data compared by the edge detector over a predetermined number of clock cycles;
  a wrap-around adder configured to advance, when triggered, by a signed number of the late versus early clock pulses received within the predetermined number of clock cycles;
  a presettable accumulator configured to accumulate a tally of the late versus early clock pulses based on one-bit overflow and underflow signals from the adder;
  a phase interpolator comprising an up-down binary counter whose signed output determines the phase shift; and
  a threshold comparator configured to receive a tally of the late versus early clock pulses and compare the tally to first and second reference values, the threshold comparator incrementing the phase interpolator when the tally exceeds a first reference value, and decrementing the phase interpolator when the tally wraps below a second reference value.

18. In a data-receiving device, a method of reproducing a clock-pulse train of a data-sending device component based on data received from the data-sending device, the method comprising:
  generating a train of clock pulses with a controlled phase shift;
  receiving the data from the data-sending device, the data including a plurality of circuit transitions;
  demultiplexing every N clock cycles of data received into a parallel data;
  for each transition of the data, determining whether a clock pulse from the train is early or late with respect to the transition based on the parallel data;
  tallying the late clock pulses relative to the early clock pulses; and
  incrementally advancing the phase shift when the late clock pulses outnumber the early clock pulses by a non-integer power of two based on a tally result accumulated over every N clock cycle.

19. The method of claim 18 wherein advancing the phase shift comprises comparing, in number, the late clock pulses relative to the early clock pulses to a non-integer power-of-two threshold value.

20. The method of claim 19 further comprising incrementally retarding the phase shift when the early pulses outnumber the late pulses by a non-integer power of two value.

* * * * *